Figures 1A, 4:
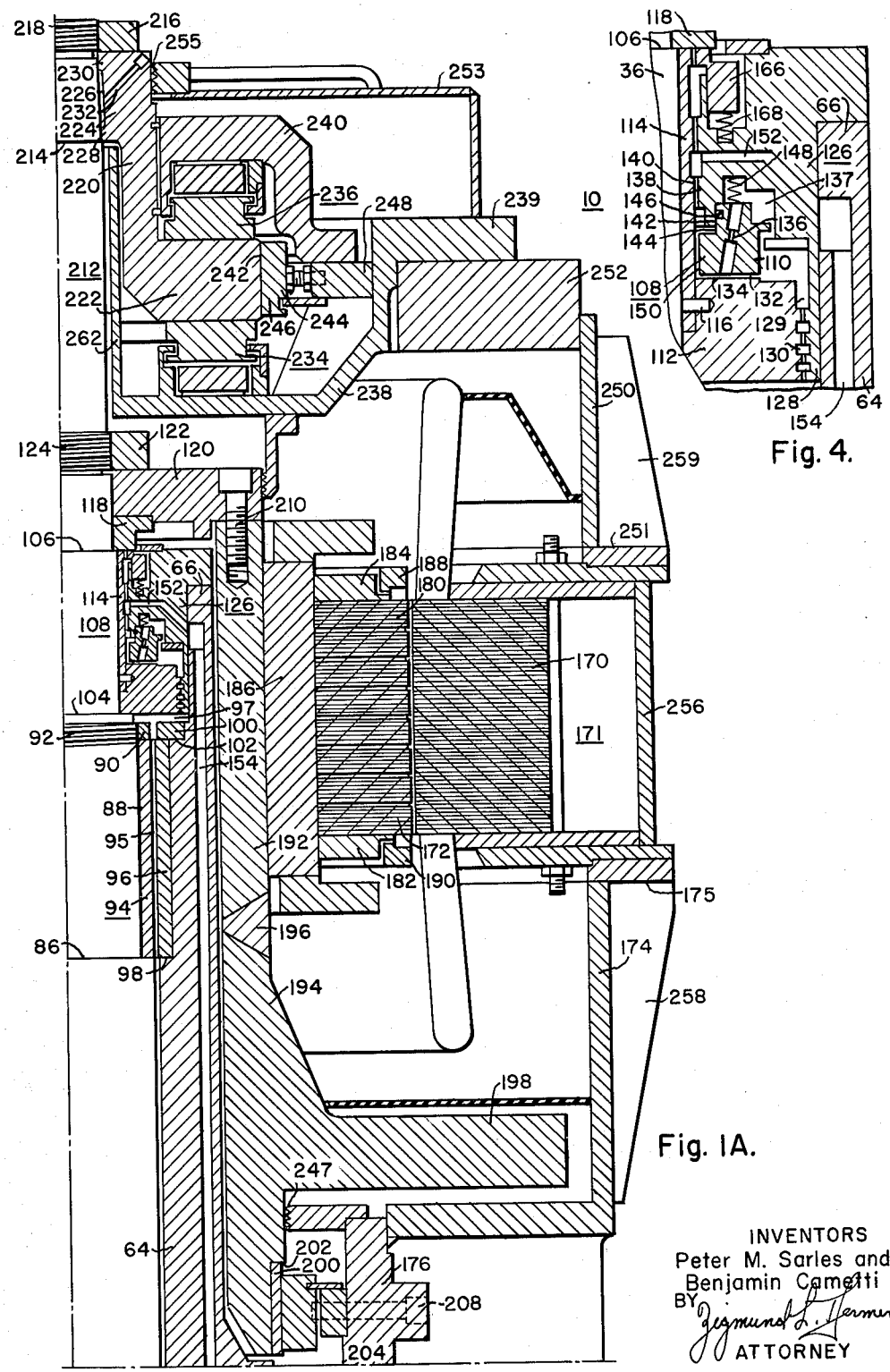

INVENTORS
Peter M. Sarles and
Benjamin Cametti
BY
ATTORNEY

United States Patent Office 3,215,083
Patented Nov. 2, 1965

3,215,083
DYNAMOELECTRIC MACHINERY FOR USE IN HIGH PRESSURE FLUID SYSTEMS
Peter M. Sarles, Mount Lebanon, and Benjamin Cametti, Pittsburgh, Pa., assignors to Westinghouse Electric Corporation, Pittsburgh, Pa., a corporation of Pennsylvania
Filed Oct. 23, 1963, Ser. No. 318,313
32 Claims. (Cl. 103—87)

This invention relates generally to dynamoelectric machinery and more particularly to such machinery wherein the shaft thereof is disposed within a pressurized fluid system.

In its more specific aspects, this invention is directed to a new and improved motor-pump unit having the motor thereof exposed to the ambient atmosphere and having means interposed intermediate the motor and the pump impeller for controlling the leakage of fluids from the unit.

Originally, motor-pump units for the pumping of fluids were constructed having a packing gland or stuffing box surrounding the shaft thereof to minimize the leakage of fluid to the ambient atmosphere. With the advent of high pressure, high temperature fluid systems wherein a poisonous or otherwise dangerous fluid is circulated therethrough at temperatures of the order of 500° F. and pressures on the order of 2500 lbs. per square inch, it was determined by designers of such systems that the possibility of leakage of dangerous fluids through the packing or stuffing box to the ambient atmosphere could not be tolerated. As a result there appeared for such systems, motor-pump units wherein the rotating parts thereof are encapsulated or totally enclosed within the fluid system. More particularly, such motor-pump units were provided with "canned" motors wherein a completely hermetic system was formed on the motor frame intermediate the rotor and stator for totally disposing the rotor within the fluid system. Such canned motor pumps do provide the assurance of essentially zero leakage and while such units have proven to be highly reliable, the provision of canned motor-pumps has resulted in a substantial increase in the cost of such units together with a substantial increase in the expense and in the difficulty of repairing such units, particularily where an unforeseen failure within the can or to the can itself occurs.

In view of the increased expense involved in the procurement and maintenance of such canned motor-pumps and the difficulties of repair thereto (necessitating long system shutdowns), system designers are being encouraged to reconsider the requirement of essentially zero leakage from such systems and to substitute for canned motor-pumps, motor-pump units having a limited, predetermined quantity of leakage therefrom together with arrangements for accommodating and handling such leakage flow. Motor-pump units falling into the latter category are designated as shaft seal pumps having controlled leakage flow. Such shaft seal pumps include a sealing means disposed along the shaft intermediate the rotor and pump impeller for limiting the flow of fluid along the shaft and for accommodating or breaking down the pressure of the system to a pressure near that of the ambient.

In controlled leakage, shaft seal pumps it is essential to provide access to the sealing portions disposed along the shaft inasmuch as the controlled leakage sealing means must always be quickly accessible in the event of improper operation.

In accordance with the prior art, such shaft sealed motor-pump units have included an elongated shaft having the rotor of the motor and the impeller of the pump mounted adjacent the opposed ends thereof and having a shaft sealing means disposed intermediate the rotor and the impeller. In order to achieve access to the sealing means, it was necessary to remove the rotor from the motor-pump unit to expose the sealing means. A removable rotor necessitates a coupling between portions of the shaft so that the rotor and its adjacent shaft portion could be decoupled from the remaining shaft portion to expose the sealing means. With such a series arrangement of parts along the shaft, the shafts of such motor-pump units and the units themselves were required to be exteremely long, necessitating the provision of substantial space in the system for accommodating in the motor-pump units. Since one end of the shaft is disposed in the pressurized system, it was necessary to provide thrust absorbing means on the shaft thereby further increasing its length.

With such long shafts and with a detachable coupling disposed therein, the prior art apparatus provided three bearings on the shaft, one of the bearings being disposed intermediate the sealing means and the impeller, with the other two bearings being disposed adjacent opposed ends of the rotor. With a long shaft and with a detachable coupling disposed thereon the problem of shaft wobble or eccentricity resulting in the loading of one of the three bearings became imminent. Furthermore the bearing disposed intermediate the impeller and the sealing means was exposed to the system fluid and therefore comprised normally a pressurized or fluidized bearing. The other two shaft bearings, however, were disposed on the ambient side of the sealing means and since such bearings are disposed in the proximity of the rotor, the bearings are not pressurized or fluidized bearings but are, of necessity, oil immersed bearings. The provision of an oil bearing on the shaft in close proximity to the fluid system provides the problem of a leakage of oil along the shaft into the fluid system which leakage results in the contamination of the fluid system.

In the limited leakage sealing means of the prior art, a failure of the sealing means resulted in the exposure of the fluid to the fluid to the ambient atmosphere and to the electrical portions of the motor. The prior art apparatus provided no secondary or back up sealing means which would permit interim operation of the motor-pump unit in the event of failure of the main seal.

In view of the aforedescribed state of the prior art, it is an object of this invention to provide a new and improved motor-pump unit having a controlled leakage shaft seal thereon with the size of such motor-pump unit being minimized.

A further object of this invention is to provide a limited leakage shaft seal motor-pump unit of compact size wherein the sealing means for the unit is easily accessible for purposes of maintenance, repair or replacement.

A still further object of this invention is to provide a dynamoelectric machine having the shaft thereof disposed in a high pressure fluidized system having a limited leakage shaft seal thereon and having a bonnet type rotor thereby permitting the use of oil immersed bearings on the rotor without the possibility of leakage of oil into the fluidized system.

A still further object of this invention is to provide a new and improved dynamoelectric machine having the shaft thereof disposed in a high pressure fluidized system and having a limited leakage main sealing means disposed along the shaft and having a back-up sealing means coupled to the shaft for operation in the event of failure of the main sealing means.

A still further object of this invention is to provide a dynamoelectric machine having the shaft thereof disposed in a pressurized fluid system and having a limited leakage sealing means coupled to the shaft so that a controlled leakage flow passes through the sealing means towards the ambient atmosphere and having an improved leakage removal flow path formed in the dynamoelectric machine.

A still further object of this invention is to provide a new and improved motor-pump unit having a limited leakage flow path therein and having a plurality of antifrictional means for permitting rotation of the shaft with the motor-pump unit being constructed to prevent loading of the antifrictional means.

A still further object of this invention is to provide a new and improved motor-pump unit of minimized size having a limited leakage shaft seal thereon and having merely two bearings coupled thereto.

A still further object of this invention is to provide a new and improved shaft seal motor-pump unit having a bonnet-type rotor wherein the shaft is provided with a pair of fluid lubricated bearings thereon and wherein the bonnet-type rotor is provided with a pair of oil immersed bearings thereon permitting the use of a conventional motor drive rigidly connected to the shaft.

In accordance with the principles of this invention, the above-described deficiencies of the prior art are overcome by the provision of a motor having the shaft thereof disposed in a pressurized fluid system, and more particularly of a motor-pump unit having a controlled leakage shaft seal thereon wherein the motor includes a bonnet-type rotor which is secured to the shaft adjacent the upper end thereof and which receives in the rotor opening thereof a substantial portion of the pressure housing of the unit so that the rotor forms a bonnet for the pressure housing. Sealing means are provided along the shaft intermediate the impeller and the rotor coupling and the sealing means may comprise either one or both of a pressure breakdown bushing and/or a face type limited leakage sealing means of the self-restoring type connected in series with the pressure breakdown bushing. In this manner, in the event of failure of the face type seal causing an increase in the flow through the sealing means, the pressure breakdown bushing which is desirably adapted to operate only upon an increase in flow therethrough provides the pressure drop between system pressure and ambient pressure resulting in a back up sealing means.

In accordance with the invention a pressure barrier extends along the shaft to a position intermediate the sealing means and the rotor coupling means. To accommodate the leakage flow through the sealing means, flow path means are provided in the pressure barrier at a position intermediate the sealing means and the rotor coupling means to receive the leakage flow. The flow path means desirably provides a path which bypasses the bonnet type rotor thereby preventing the exposure of the rotor to the system fluid. The use of a bonnet type rotor of the character described results in the provision of a relatively short, compact unit. Since one end of the shaft is disposed in the pressurized system and the other end of the shaft is exposed to the ambient atmosphere, it is necessary to provide an axial thrust absorbing means for the motor pump. In furtherance of this purpose a thrust runner desirably is mounted on the shaft at a position intermediate the upper end thereof and the rotor coupling means and suitable thrust absorbing means, such as thrust pads for absorbing up thrust and down thrust on the shaft are provided. It will therefore be seen that the sealing means of the motor-pump unit is exposed for purposes of maintenance, repair and replacement by merely removing the thrust absorbing means and the rotor coupling means from the shaft.

Antifrictional means for the motor-pump unit desirably are provided. In one embodiment of this invention, the antifrictional means may comprise a single fluid lubricated bearing, for example a pressurized fluid bearing coupled between the shaft and the pressure barrier at a position intermediate the sealing means and the impeller, together with a pair of conventional oil lubricated bearings, desirably of the adjustable type, for example pivoted pad bearings, coupled to upper and lower portions of the rotor. The use of conventional adjustable bearings on the rotor suitably prevents the preloading of any of the bearings during start up or continued operation, and since the rotor is rigidly connected to the shaft, prevents the possibility of shaft orbiting during operation. In addition, the oil lubricated bearings are not coupled to the rotor at positions above the shaft, but rather are disposed outwardly of the shaft, thereby preventing the possibility of oil leakage from the bearings into the fluid system.

In another embodiment of this invention, a second fluid lubricated or pressurized fluid bearing may be disposed along the shaft intermediate the two series connected sealing means thereby resulting in a four bearing system. In this manner a conventional bonnet type motor, which can be purchased commercially as a complete unit, may be utilized with the specialized pump unit of this invention, thereby decreasing substantially the cost of the unit. The fact that the shaft is provided with a pair of pressurized fluid bearings thereon also serves to minimize the possibility of shaft orbiting.

In a still further embodiment of this invention, the shaft is provided with the aforedescribed pair of pressurized fluid bearings and the bonnet type rotor includes no bearings thereon. In this manner, there is no possibility of preloading the bearings of the motor pump unit. The rotor and stator are provided with a sufficient air gap to prevent any possibility of engagement therebetween. Eccentric rotation of the rotor is prevented by the rigid connection between the rotor and the shaft. Of course, the latter arrangement is suitable only for relatively smaller units wherein the amount of flux in the air gap is relatively small.

In accordance with one example of this invention, a separate, pressurized fluid system may be utilized for the purpose of supplying leakage flow fluid to the sealing means as well as for the provision of fluid for operating the fluidized bearings. Such a separate fluid supply may be helpful in systems wherein the fluid being pumped is maintained at an elevated temperature. With such systems the auxiliary leakage flow system desirably provides a relatively cool fluid to assist the cooling of the rotor. In addition, an auxiliary cooling system, while permitting a minimum amount of mixing of fluid between the auxiliary fluid and the main system fluid, prevents the necessity of accommodating or reinserting the leakage fluid into the main system. However it is to be realized that the main system fluid may be utilized to provide the leakage flow, if desired.

Other objects and advantages of the instant invention will become apparent as the following description proceeds and features of novelty which characterize the invention will be pointed out in particularity in the claims annexed to and forming a part of this specification.

Figure 1B:
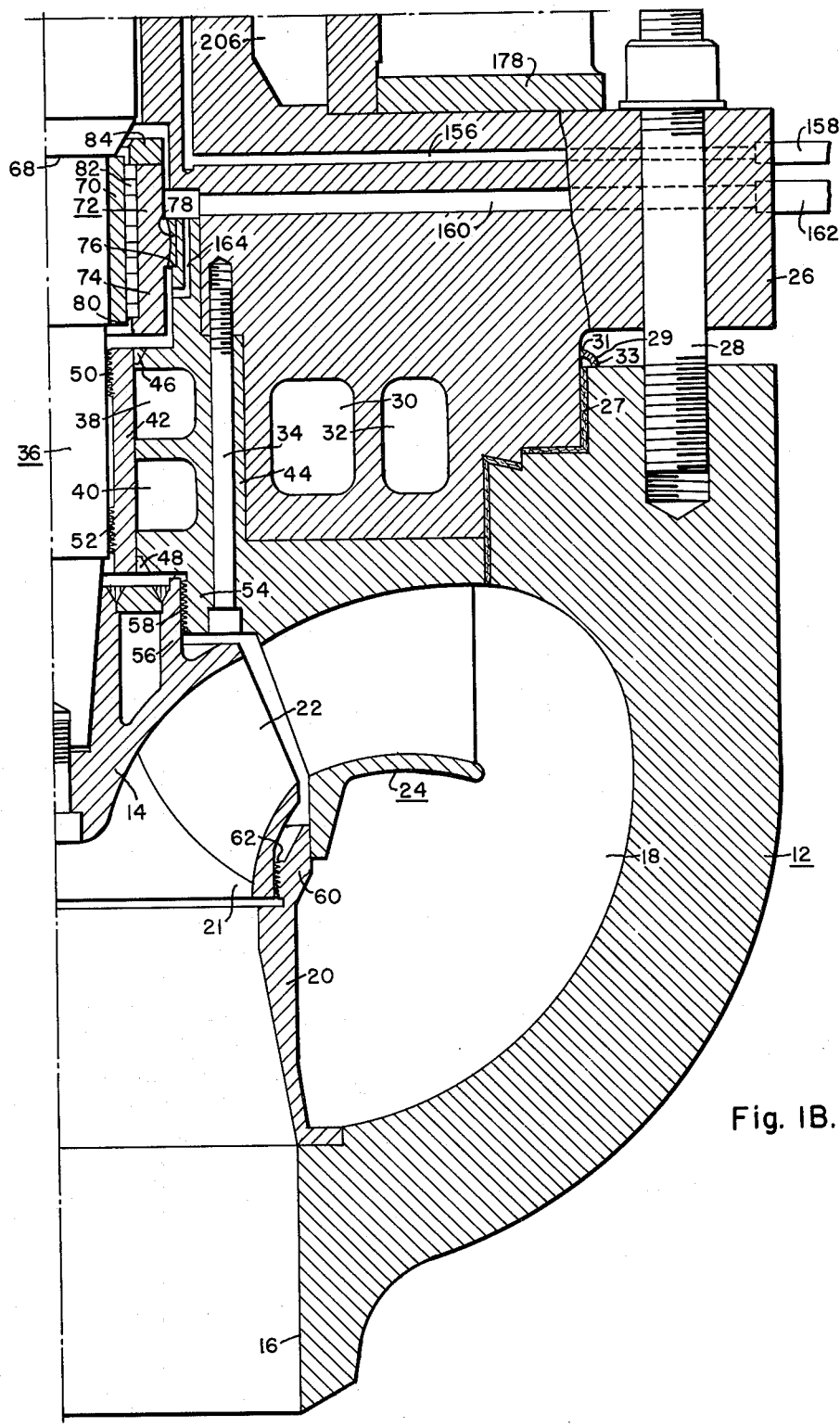
Figure 2A:
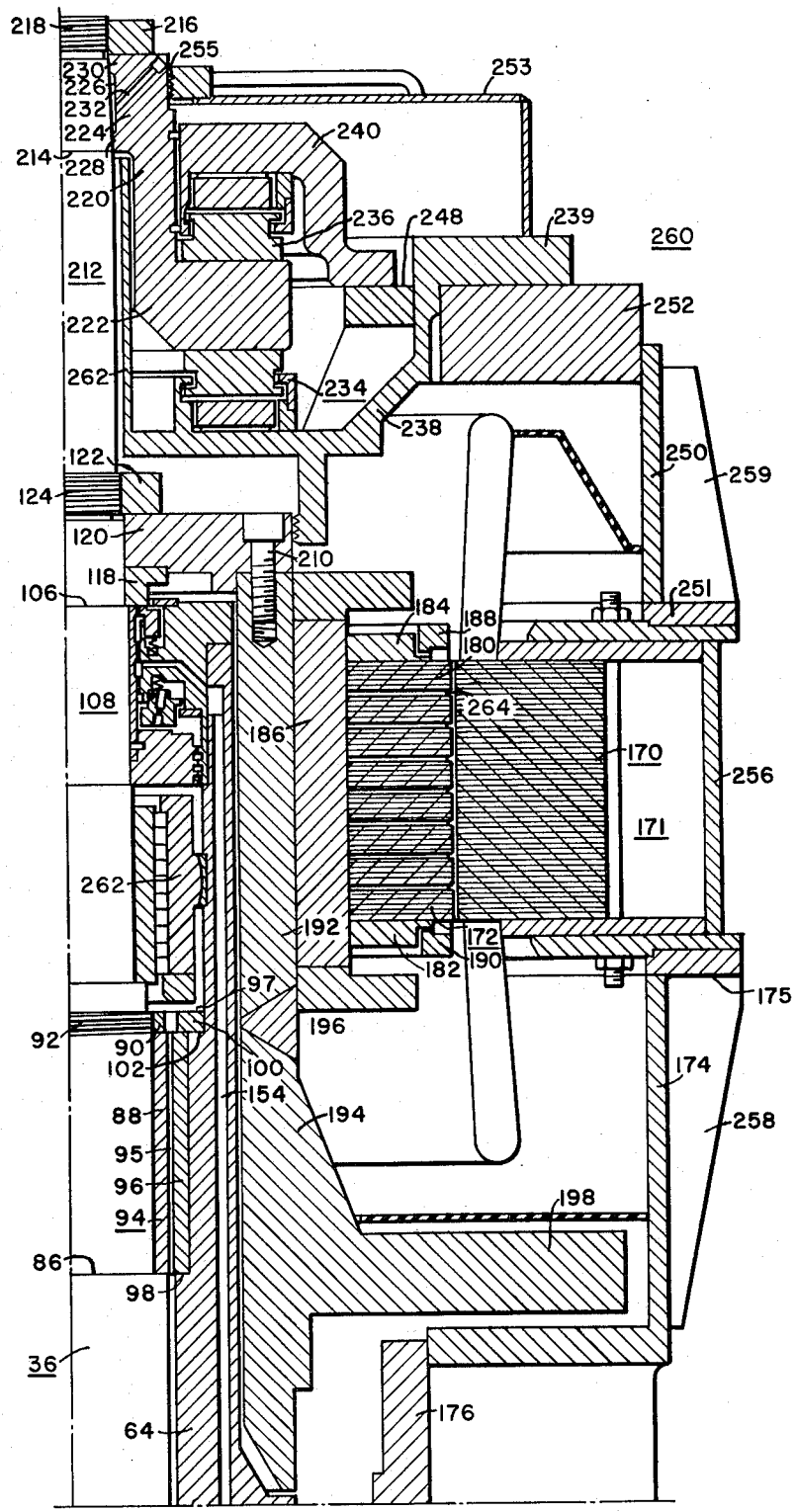
Figure 2B:
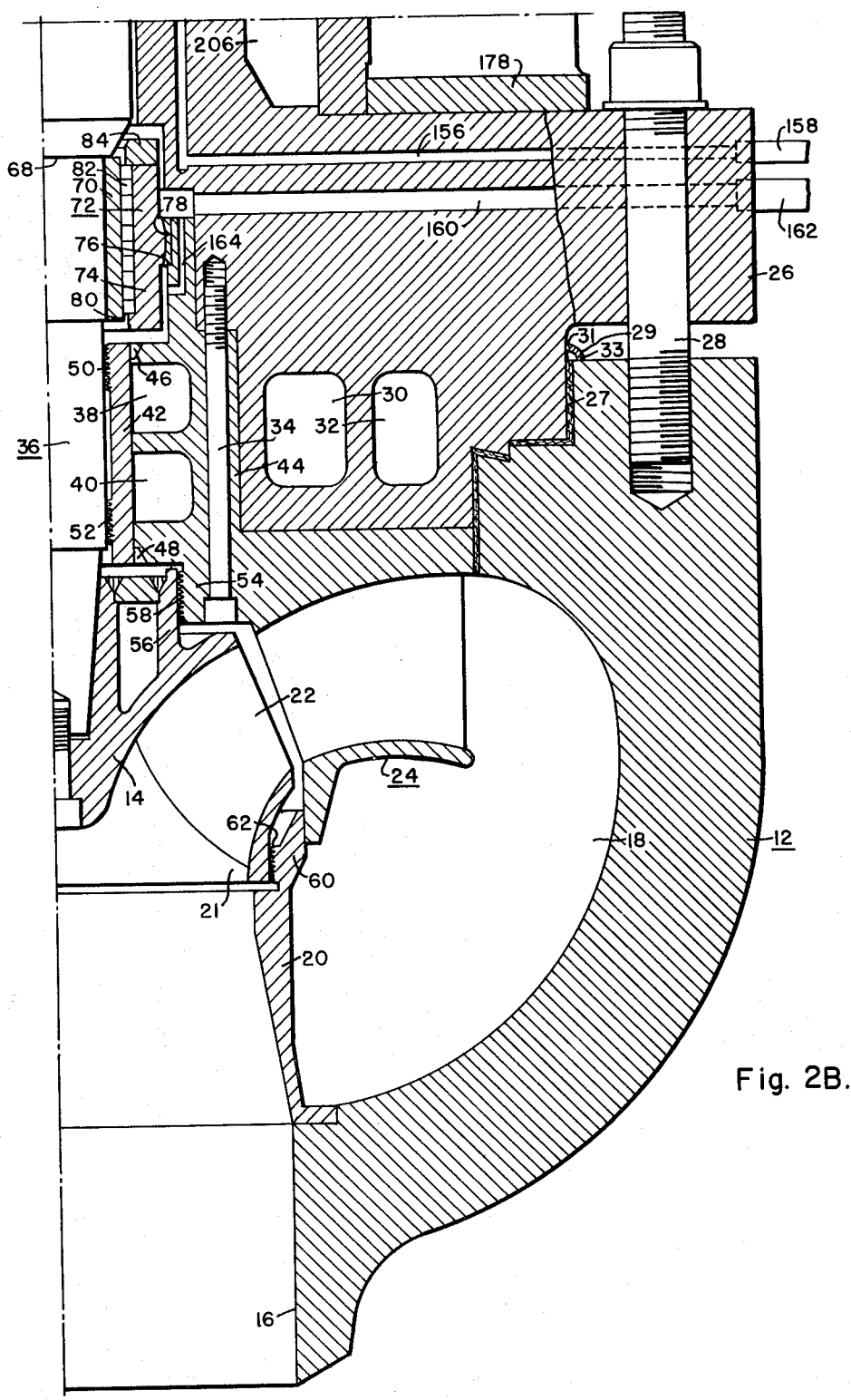
Figure 3A:
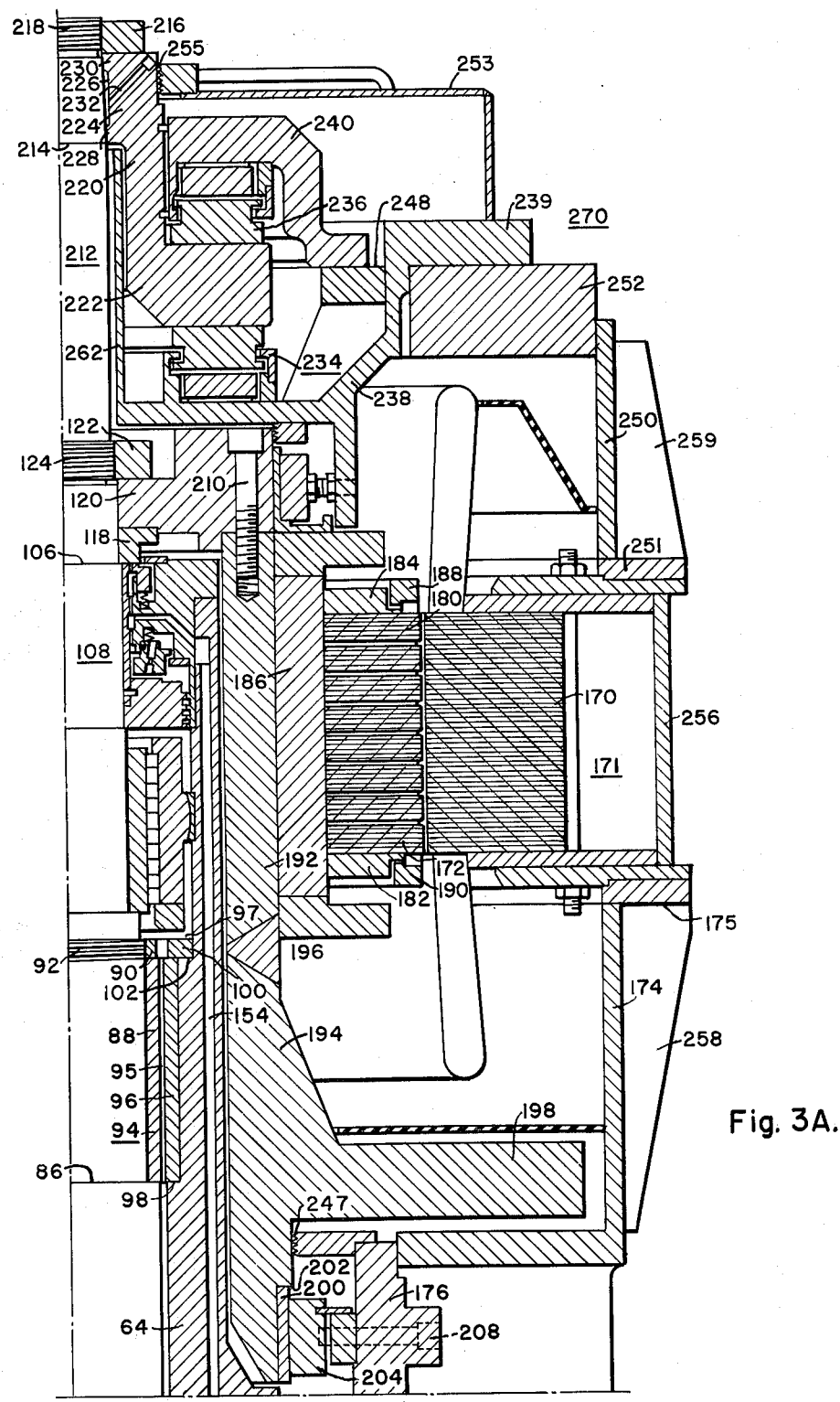
Figure 3B:
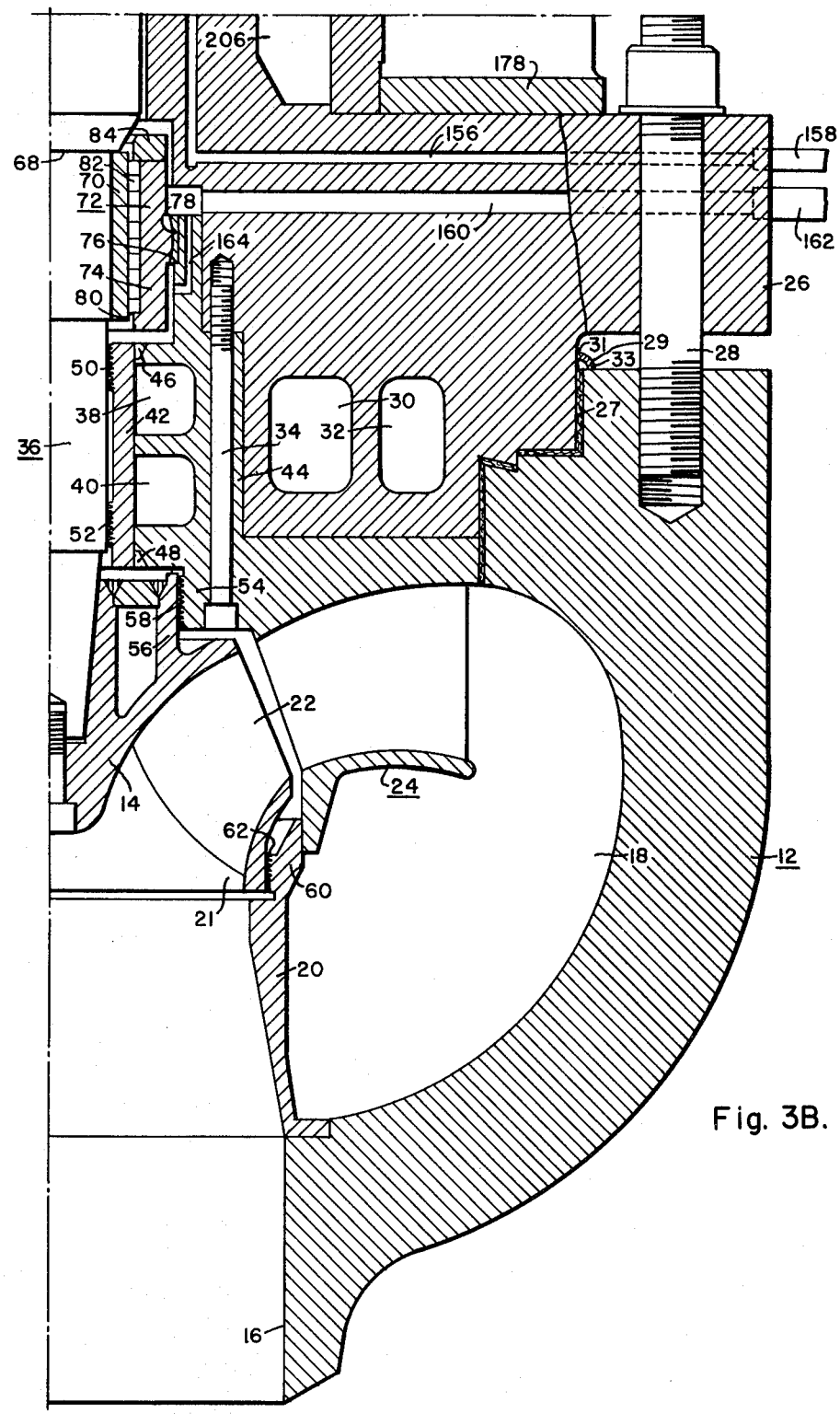

For a better understanding of the invention reference may be had to the accompanying drawings, in which:

FIGS. 1A and 1B when placed end to end comprise a sectional view of a motor-pump unit incorporating the principles of this invention;

FIGS. 2A and 2B when taken end to end comprise a sectional view of a modified form of the motor-pump unit of FIGS. 1A and 1B; and FIGS. 3A and 3B, when taken end to end, comprise a sectional view through an additional embodiment of the motor-pump unit of this invention;

FIG. 4 is an enlarged fragmentary view of one of the seals of FIGS. 1A, 2A and 3A.

Referring now to FIGS. 1A and 1B, there is illustrated therein a motor-pump unit 10 depicting an illustrative embodiment of this invention. The motor-pump 10 includes a centrifugal pump casing 12 adapted to receive therein an impeller 14 of a centrifugal pump. The casing 10 includes an intake port 16, an outlet port (not shown), and a diffuser region, designated by the reference character 18. The casing 12 is provided at its intake port 16 with flow directing means 20 which directs fluid entering the intake port 16 toward the eye 21 of the impeller and which separates the intake port 16 from the diffuser region 18. The outlet portion 22 of the impeller 14 communicates with a diffuser structure 24 mounted in the upper portion of the diffuser region 18. The pump casing 12 is provided with a cover means 26 which encloses a portion of the diffuser region and which is secured to the pump casing 12 by suitable means such as by bolts 28. Gasket means 27 may be inserted intermediate the cover 26 and pump casing 12 to prevent leakage therebetween. In addition, for hermetic sealing, an annular canopy seal 29 may be positioned across the gasket means 27 and welded to the cover 26 and casing 12, respectively, by annular welds 31 and 33. The cover means 26 includes heat flow impeding means therein, for example, the annular openings 30 and 32 which form a thermal barrier to prevent the transmission of heat from the interior of the pump casing toward the driving motor of the pump. The diffuser structure 24 includes an upstanding hub portion 44 which is secured to the cover means 26 by bolts 34. The hub portion 44 includes a central opening therein through which the shaft 36 of the motor pump passes. The hub 44 is provided with a pair of stagnant heat flow impeding volumes 38 and 40 to impede the flow of heat in the same manner as the thermal barriers 30 and 32 with the volumes 38 and 40 comprising a pair of annular grooves machined into the hub 44. The latter grooves are enclosed by an annular sleeve 42 secured at its ends to the hub 44 of the diffuser structure 24 by suitable means such as by annular welds 46 and 48. The sleeve closely receives a juxtaposed portion of the shaft 36 therein and includes means formed thereon for impeding the flow of fluid in the annular space between the sleeve 42 and the shaft 36. The last-mentioned flow impeding means may comprise a pair of labyrinthine seals 50 and 52 which are suitably formed on the inner surface of the sleeve 42. In addition, the lower end of the hub includes an annular stepped portion 54 closely receiving an upstanding end 56 of the impeller 14. On an axially extending surface of the stepped portion 54 there is provided, a flow impeding means, such as a labyrinthine seal 58. The lower end of the impeller 14 is mounted to be received within a stepped portion 60 of the flow directing means 20 and there is disposed between juxtaposed portions of the impeller 14 and stepped portion 60 still another flow impeding means, such as labyrinthine seal 62, which limits a bypass flow of fluid from the flow directing means 20 to the diffuser structure 24.

The cover means 26 is provided with an upstanding pressure barrier 64 of annular configuration which closely receives a substantial portion of the shaft 36 in the opening thereof and which terminates with its upper surface 66 positioned below the upper end of the shaft 36. The shaft 36 is provided with a shoulder formed thereon at 68 at a position adjacent the cover 26. The shoulder 68 engages a bearing journal 70 mounted on the shaft 36 by suitable means such as by press fitting and fixedly positioned by the shoulder 68. The journal 70 is positioned in juxtaposed relationship with an antifrictional means such as bearing 72 which is in this example of the invention is illustrated as a pressurized fluid, sleeve bearing. The bearing 72 desirably is provided with a retainer 74 which is mounted on a shoulder 76 formed on the inward opening of the hub 44 and which receives a bearing support member 78 thereon. The retainer 74 is formed with an inwardly facing shoulder 80 thereon which receives the bearing sleeve 82 with the sleeve 82 in this example being formed by a plurality of tandemly mounted ring members formed from a suitable bearing material, for example graphitar. The rings 82 are fixedly positioned relative to the retainer by a ring member 84 mounted on the upper end of the retainer 74 and fixedly secured thereto by suitable means (not shown).

The shaft 36 is provided with another shoulder 86 formed thereon at a position upwardly of the shoulder 68 with the shoulder 86 being formed to receive a sleeve member 88. The sleeve 88 is fixedly positioned against the shoulder 86 by a retaining ring 90 which is threadedly secured to the shift 36 by threads 92. The sleeve 88 is formed in this example of this invention to act as a portion of a pressure breakdown bushing with the latter bushing being designated generally by the reference character 94. The pressure breakdown bushing 94 is provided with a second sleeve 96 mounted in juxtaposed relationship to the sleeve 88 and fixedly positioned on an inward shoulder 98 formed on the pressure barrier 64. The sleeve 96 is mounted in abutting relationship with the shoulder 98 by a retaining ring 100 disposed on a shoulder 102 formed on the pressure barrier 64 adjacent the upward end of sleeve 96. The retaining ring 100 is fixedly positioned on the shoulder 102 by suitable securing means (not shown). An additional pair of upwardly facing shoulders 104 and 106 are formed on the shaft 36 and are utilized to position a limited leakage sealing means 108 illustrated in this example of the invention as a non-contact face type seal. The seal 108 is formed by a relatively stationary or floating member 110 in combination with a rotating member or runner 112. The runner 112 desirably is fixedly mounted on the shaft 36 for rotation therewith by suitable means. For example, the runner 112 is disposed with its lower surface on the shoulder 104 and is fixedly positioned by a spacing sleeve 114 secured to the runner 112 by suitable means such as by pins 116. Spacing sleeve 114 and the central opening of the annular runner 112 are formed to closely receive the juxtaposed portion of the shaft 36 therein to prevent leakage therebetween. The runner 112 and the spacing sleeve 114 may be mounted on the shaft 36 by a press fit and may be fixedly positioned by a retaining ring 118 disposed on the shoulder 106 in engagement with the upper end of the sleeve 114. The retaining ring 118 also serves to fixedly position an annular rotor supporting member 120 which is desirably press fit to the shaft 36 and fixedly positioned by suitable retaining means such as a lock nut 122, with the latter being threadedly secured to the shaft 36 by threads 124.

In accordance with the invention, the pressure barrier 64 desirably is provided with an annular cap member 126 of stepped configuration which is complementarily shaped to be received by the upper end of the pressure barrier 64. The cap member 126 includes a lower extension 128 which extends downwardly along the inner surface of the pressure barrier 64 to a position juxtaposed to the runner 112. The juxtaposed portions of the extension 128 and the runner 112 desirably form a sealing means therebetween, for example a labyrinthine type seal 130 formed by a plurality of grooves machined in the opposed surfaces of the runner 112 and the extension 128. The seal ring 110 is formed with a lower surface 132 mounted in opposed relationship with the surface 134 on the runner 112. During operation of the motor pump 10, the surfaces 132 and 134 are spaced apart a distance of a fraction of one mil and a fluid film producing region is formed therebetween.

Referring now to FIG. 4, the seal 108 desirably is of the self-restoring type, that is, is of the type which provides a restoring force to maintain a constant gap for the film producing region in the event of displacement of the film producing region by virtue of transient operation of the motor pump 10. In furtherance of this purpose, orificing means designated by the reference character 136 extended from one end of the ring 110 to the surface 132 at a position intermediate the film producing region. The orificing means 136 (only one of which is shown in FIGS. 1A and 4) desirably includes a plurality of symmetrically disposed orifices formed on the seal ring 110. By virtue of the shape of the seal ring 110, a change in the size of the gap between the surfaces 132 and 134, caused by pump operation, for example by a pressure surge or by orbiting or wobble of the shaft 36, is counteracted by a force on the seal ring 110, created by the fluid under pressure and by the particular shape of the ring 110, to restore the width of the film producing region to its predetermined size. The cap member 126 overlies the upper surfaces of the seal ring 110 and is provided with a projection 138 thereon disposed intermediate a portion of the seal ring 110 and the shaft 36. The projection 138 provides a clearance 140 along the shaft and includes an axially extending surface 142 thereon disposed to slidably engage an axially extending surface 144 of the seal ring 110. To prevent the leakage of fluid along the path intermediate the surfaces 142 and 144, a sealing means for example an O-ring 146 is positioned on either the projection 138 or the seal ring 112. A resilient means is interposed between the cap member 126 and the seal ring 110 for the purpose of biasing the surface 132 of the seal ring 110 into engagement with the surface 134 of the runner 112. The biasing means is illustrated in this example as a spring 148 which serves to close the film producing region of the seal 108 only in the event of a zero pressure differential thereacross. The inner surface of the seal ring 110 is positioned to provide a clearance or leakage flow space 150 between the seal ring and the shaft 36 with the leakage space 150 communicating with the inward end of the film producing region.

In accordance with the invention, high pressure fluid is disposed along the clearance space between the pressure barrier 64 and the shaft 36. Accordingly, the pressure breakdown bushing 94 is subjected to the high pressure and, depending upon the rate of flow of fluid through the gap 95 of the breakdown bushing 94, a pressure reduction is produced by the breakdown bushing 94. At extremely low flow rates (the normal operating condition), however, the effectiveness of the pressure breakdown bushing 94 is minimal so that substantially the entire system pressure exists in the region 97 above the gap 95. The high pressure is also located in the region 129 above the labyrinthine seal 130 and in the chamber 137 intermediate the seal ring 110 and the cap member 126. By virtue of the seal ring 110, a pressure drop is produced across the film producing region so that the leakage space 150 is at a pressure substantially equal to ambient pressure. For operation of the face type seal 108, it is necessary for a relatively small leakage flow to pass through the film producing region to the area 150. For example, a leakage flow on the order of 1 gallon per minute is sufficient for the operation of the seal 108.

On the other hand, for the breakdown bushing 94 to be effective, a leakage flow substantially higher in magnitude than the leakage flow for the seal 108 is required. It will therefore be seen that while the seal 108 is in operation, the breakdown bushing 94 is ineffective as a pressure breakdown means, since the bushing 94 and seal 108 are mounted in series along the flow path.

Means are provided for removing the leakage flow through the seal 108 from the motor pump 10, preventing such flow from contacting the motor 171 of the motor pump 10. In furtherance of this purpose, the cap member 126 is provided with a passageway 152 therein which communicates with the clearance space 140, connecting the clearance space 140 and to a passageway 154 formed in the pressure barrier 64. The passageway 154 extends longitudinally through the pressure barrier 64 and communicates with a laterally extending passageway 156 formed in the cover 26. The passageways 154 and 156 are connected to a conduit means 158 which conducts the leakage flow to an external flow circuit.

For applications of the motor pump 10, with high temperature system, it is desirable to utilize a separate leakage flow circuit for the motor pump 10. The separate flow circuit provides relatively cool fluid to the seal 108, thereby preventing flashing as the fluid passes to regions of ambient pressure. In addition, since the sealing means 108 includes O-rings thereon, desirably formed from rubber, it is necessary for the temperature of fluid adjacent the seal means 108 to be at a relatively low level. Accordingly, an auxiliary circuit desirably is provided for supplying leakage fluid to the seal 108. More particularly, the cover member 26 is provided with a passageway 160 therein which is connected to a supply conduit 162, with the passageway 160 leading to the region intermediate the shaft 36 and the pressure barrier 64. An additional conduit 164 is formed in the hub 44 for admitting the leakage fluid to the lower portion of the bearing 72 for supplying fluid for operation thereof. It will therefore be appreciated that the external source of leakage fluid is maintained at a relatively low temperature and at a pressure slightly higher than the pressure in the pump casing. In this manner the flow of fluid from the conduit 160 into the pump casing is minimized by virtue of the relatively small pressure differences therebetween and by the labyrinthine seals 50, 52 and 58. Furthermore, the relatively low temperature of the fluid serves not only to prevent flashing and to preserve the O-ring 146 of the seal 108 but also to cool the motor portion of the motor pump 10 in a manner to be described.

It is to be further noted that the leakage flow accommodating means formed by the passageways 152, 154 and 156 desirably in size to accommodate a quantity of leakage flow necessary to operate the pressure breakdown bushing 94. For this purpose an additional number of passageways 152, 154 and 156 may be formed respectively in the cap member 126 the pressure barrier 64 and the cover 26.

Inasmuch as the flow of leakage fluid must be prevented from coming into contact with the electrical portions of the motor pump 10, a back up seal means, for example a wear ring 166 is provided intermediate the retaining ring 118 and the cap 126. The wear ring 166 is biased into engagement with the retaining ring 118 by resilient means such as spring 168 and serves to prevent leakage therepast.

The motor 171 of the motor pump unit 10 includes a stator 170 and a rotor 172. The stator 170 is mounted by suitable mounting brackets 174, 176 and 178 on the cover member 26 and is of conventional annular configuration with the central opening thereof receiving the rotor 172. The rotor 172 may be formed from one of many conventional constructions, for example may be of the squirrel cage type having circular conductor bars 188 and 190 mounted on the ends of the rotor and having axially extending conductors (not shown) bringing the bars 188 and 190. The rotor includes a core 180 positioned between end rings 182 and 184 which are mounted on a backing member of annular configuration and designated by the reference character 186. The rotor core 180 and end rings 182 and 184 desirably are positioned on the backing member 186 by suitable means such as by welding the end rings 182 and 184 to the backing member. The backing member 186 is mounted on an elongated annular supporting ring 192. The supporting ring 192 includes a lower extension 194 with the extension 194 being secured to the ring 192 by suitable means such as by a weld at 196. The rings 192 and 194 are positioned to receive in the central openings thereof the pressure barrier 64 and are positioned with a running clearance therebetween to prevent engagement of the rings 192 and 194 with the pressure barrier 64 during rotation of the rotor 172. The support extension 194 is provided with a suitable rotation inertia means such as a flywheel 198 disposed adjacent the lower end of the stator mounting bracket 174 and includes at its lower end, a bearing journal 200 positioned on the lower portion of the extension 194 by an integral shoulder 202.

The stator mounting bracket 176 desirably is provided with an anti-frictional means 204 disposed to receive the journal 200 therein to accommodate rotation of the rotor 172. The anti-frictional means 204 in this example of the invention may comprise an oil immersed bearing with an oil chamber therefor being formed at 206 by complementary portions of the cover 26, strator support 176 and pressure barrier 64. The bearing 204 desirably is of an adjustable type to prevent preloading of the bearing during start up and may comprise an adjustable pivoted pad sleeve bearing with adjustment means indicated generally by the reference character 208.

It will therefore be appreciated that the rotor 172 of the motor pump 10 is of the bonnet type and is mounted in a cantilever manner to overlie the pressure barrier 64. In furtherance of this purpose the rotor supporting member 120 is positioned to engage the upper surface of the support ring 192 and is rigidly secured thereto by suitable means such as by bolts 210. The rotor 172 thereby causes rotation of the shaft 36 by means of the rigid connection to the shaft 36 by the rotor supporting means 120.

As is known by those skilled in the art, the shafts of relatively large motor pump units are subjected to axial thrust during pump operation. For motor pump units of the "canned" type, the maximum value of the axial thrust is relatively low inasmuch as both ends of the shaft of the motor pump unit are subjected to substantially the same pressure. In the instant arrangement, the shaft 36 of the motor pump unit has its lower end disposed in and subjected to the relatively high system pressure while the upper end of the shaft is exposed to merely ambient pressure. As a result there is continuously exerted upon the shaft 36 substantial axial thrust caused by the system pressure. In order to accommodate the axial thrust on the shaft 36, there is provided a thrust runner 212 removably secured to the shaft by a lock nut 216 threadedly mounted on threads 218. To reduce the height of the motor pump 10, the thrust runner 212 desirably includes a securing portion 224 and a downwardly extending central portion 220 which terminates in a laterally extending runner portion 222 which is vertically offset from the upper or secured portion 224 of the thrust runner 212.

To fixedly secure the runner 212 to the shaft 36, the shaft desirably is slightly tapered intermediate threads 218 and the shaft position indicated by the reference character 214. The upper portion 224 of the runner 212 desirably is provided with a relatively narrow annular groove 226 therein resulting in a pair of legs 228 and 230 which engage the tapered portion of the shaft 36. The legs 228 and 230 are complmentarily tapered to be received on the shaft 36 with the lower end of the leg 228 disposed in engagement with the shoulder 214. A passageway 232 is formed in the securing portion 224 connecting the groove 226 to the exterior of the motor pump unit. Accordingly, in the event removal of the runner is desired, the lock nut 216 is removed from the shaft 236 and the runner 212 is lifted toward the upper end of the shaft 36. In the event the legs 228 and 230 bind to the shaft 36, the ambient end of the passageway 232 may be coupled to a high pressure source, for example a high pressure water supply, which forces water into the groove 226. The water pressure causes expansion of the securing portion 224 relative to the shaft 36 permitting removal of the runner 212.

It will be appreciated that the grooving and pressurizing arrangement for the mounting portion 224 of the runner 222 may also be utilized for mounting of the rotor supporting means 120 in order to ensure ease of removal thereof during maintenance of the motor pump unit.

The runner portion 222 of the thrust runner 212 is mounted between a pair of annular thrust bearings 234 and 236 positioned respectively to absorb upthrust and downthrust on the shaft 36. Each of the thrust bearings 234 and 236 desirably is formed of conventional construction and may comprise oil immersed thrust bearings with the oil for the thrust bearings being retained within housings 238 and 240. In furtherance of this purpose, the housings 238 and 240 are of generally cup-shaped configurations and serve to support each of the thrust bearings relative to the thrust runner 212. In addition the housing 238 includes an upstanding wall portion 262 which is disposed between juxtaposed portions of the shaft 36 and thrust runner 212 to limit the leakage of oil therepast.

The outward axial surface 242 of the thrust runner 212, in this example of the invention serves as a bearing journal for a sleeve bearing 244, which is desirably an oil immersed bearing having adjustable bearing shoes 246 thereon. The bearing 244 may comprise the same type of bearing as the bearing 204, i.e., a pivoted pad sleeve bearing. The bearing 244 is supported on a bearing support member 248 which in turn is mounted on the stator housing for the motor pump 10. More particularly the upper end of the stator 170 is enclosed by a housing sleeve 250 which is desirably detachably coupled at its upper end to a stator end ring 252. The bearing support means 238 is provided with a flange 239 removably secured to the end ring 252 to suspend in a cantilever fashion the housing 238 from the end ring 252. The bearing support means 248 is secured to the member 238 and the bearing support 240 extends from the support 248. Each of the stator enclosure portions 174 and 250 desirably are of an L-shaped configuration having flange means 175 and 251 secured to portions of the stator. Each of the flange means are maintained axially in position by an outer spacer 256, and the supports 174 and 250 desirably are strengthtened by means of laterally extending ribs 258 and 259, respectively.

As has been pointed out, it is desirable in the construction of limited leakage shaft sealed pumps of the character described herein to provide an arrangement wherein access to the sealing means 108 is afforded for purposes of maintenance and repair of the motor pump 10. In furtherance of this purpose, the runner 212 is removably mounted on the shaft 36 and the bearing housing flange 239 is removably mounted on the end ring 252. Accordingly, the entire bearing housing 238 and the runner 222 may be removed from the motor pump unit 10 providing access to the rotor supporting means 120 from above the pump. Removal of the locking means 122 and of the mounting bolts 210 for the rotor permits the removal of the rotor supporting means and of the annulus 118 thereby exposing the cap member 126 to the pump exterior. The cap member 126 may also be removed permitting thereby the removal of the seal ring 110 and if desired of the seal runner 112 and the spacing sleeve 114. In this manner the pressure breakdown bushing 94 is also exposed to the ambient for purposes of repair. The sealing means 108 may be replaced either as a unit or merely by the replacement or machining of damaged parts. Such repair and replacement of the sealing means 108 is achieved in accordance with this invention without the necessity of removal of the stator 170 or rotor 172. In addition, it is unnecessary to decouple separate portions of the shaft or to remove any portion of the shaft from the motor pump.

It will be further noted that the use of a bonnet type or cantilever rotor 172 surrounded by a stator 170 at a position juxtaposed to a portion of the pressure barrier 64 reduces substantially the height of the motor pump 10. Furthermore, the motor pump 10 includes three anti-frictional means for permitting rotation thereof; i.e., the bearing 72, 204 and 244 each of which are coupled to each other by fixedly secured mounting members. In this manner, particularly where the bearings 204 and 244 have adjustable pads thereon, the start up and continued operation of the motor pump unit 10 may be achieved without preloading any of the bearings since adjustment of bearings 204 and 244 from the exterior of the unit may be made. Furthermore, by virtue of the relative axial locations of the bearings 72 and 204, and by virtue of the rigid connection between each of the bearings, the problems of a three bearing on a shaft system does not exist. It will be further noted that with the illustrative embodiment of this invention illustrated in FIGS. 1A and 1B, both of the thrust bearings 234 and 236 and the sleeve bearings 244 and 204 are of the oil immersed type and are provided with suitable oil retention means to prevent the leakage of oil into the interior of the motor pump. The bearing arrangement is therefore of conventional construction and oil is retained adjacent the bearings by means of a labyrinthine seal 247 disposed on the support 176 and positioned to engage the lower extension 194 of the rotor support and by an upper housing 253 and labyrinthine seal 255 which encloses the upper ends of the bearings 234, 236 and 244.

It will be further noted that the pressure barrier 64 closely receives adjacent portions of the shaft in the opening thereof thereby, by nature, forming a pressure reducing orifice for the motor pump unit. Furthermore in the event of failure of the limited leakage sealing means 108, it will be noted that the pressure reducing means 94 is mounted in series therewith. Since the pressure reducing means 94 requires a substantially greater leakage flow therethrough to become effective than the face type seal 108, a failure of the seal 108 resulting in an increased leakage flow therethrough causes an increase in the flow through the breakdown bushing 94 thereby causing the breakdown bushing to provide a substantial pressure reduction. Inasmuch as the leakage flow passage means formed by passageways 152, 154 and 156 are formed to have greater leakage capacity, the leakage flow through the pressure breakdown bushing 94 not only causes a substantial pressure drop thereacross but also results in the removal of the leakage flow along a bypass flow path before such leakage flow reaches the exposed rotor or stator windings. The leakage bypass flow path through the pressure barrier 64 also serves as a cooling fluid to remove heat from the rotor 172.

It will be further noted that an annular rotor motor of the type illustrated in FIG. 1A are commercially available on the market and as such, the construction of the motor pump unit 10 will not require the provision of a specially designed motor.

Referring now to the embodiments of this invention illustrated in FIGS. 2A and 2B and in FIGS. 3A and 3B, it will be noted that, where appropriate, like parts of the apparatus described in detail in FIG. 1A will be provided with the same reference characters heretofore used but that such like parts will not again be described in detail.

In the arrangement of FIGS. 2A and 2B, the motor pump unit 260 thereof is provided solely with two fluidized sleeve bearings. The sleeve bearing 72 of FIG. 1 is retained in the FIG. 2A-2B embodiment. The sleeve bearings 244 and 204 of FIGS. 1A and 1B have been removed and there have been substituted in their stead a sleeve bearing of the pressurized fluid type designated by the reference character 262. The bearing 262 is disposed intermedate the pressure breakdown bushing 94 and the face type sealing means 108. Therefore, the fluid supply to the pressurized bearing 262 comprises the leakage fluid flowing intermediate the shaft 36 and the pressure barrier 64. With the arrangement of FIGS. 2A and 2B, it will be seen that a purely two bearing system has been provided eliminating thereby the possibility of preloading of the bearings. With this construction, however, extreme case must be taken in the construction of the motor pump 260 to prevent the fluxes developed in the air gap between the rotor 172 and the stator 170 to cause orbiting of the rotor 172 within the air gap 264. Accordingly, the arrangement of FIGS. 2A and 2B may be deemed undesirable where extremely large motor pump units 260 are constructed so that the magnitudes of the motor flux are extremely high values.

In the embodiment of the invention illustrated in FIGS. 3A and 3B, the motor pump unit 270 includes the bearings 72 and 204 of FIGS. 1A and 1B but is formed with a sleeve bearing 272 coupled to a journal 274 formed on the rotor mounting means 276. The bearing 272 is substituted for the upper sleeve bearing 244 of FIGS. 1A and 1B with the bearing 244 having been coupled to the thrust runner 212. In addition, the pressurized fluid bearing 262 of FIGS. 2A and 2B is disposed intermediate the pressure breakdown bushing 94 and the sealing means 108 of the motor pump 270. With the arrangement of FIGS. 3A and 3B, a motor pump unit having four bearings has been provided. In this manner, a conventional motor 171 may be procured with the bearings 204 and 272 attached thereto. In addition, the shaft 36 of FIGS. 3A and 3B is self supporting inasmuch as it is provided with two bearings 72 and 262 thereon for permitting rotation thereof. The use of a four bearing system of FIGS. 3A and 3B permits an increase in the self-reliance of the shaft 36 and of the motor 171, permitting greater interchangeability of parts and limiting to a substantial degree, any possibility of orbiting of the upper end of the shaft 36.

In all other respects, the modifications illustrated in FIGS. 2A and 2B and in FIGS. 3A and 3B remain substantially the same as the arrangement of FIGS. 1A and 1B.

From the foregoing, it will be appreciated that many further modifications and arrangements of motor pump units of the character described in this specification can be made without departing from the broad spirit and scope of this invention. Accordingly, it is specifically intended that the motor pump arrangements illustrated and described above be interpreted as illustrative of this invention, rather than limitive thereof.

We claim as our invention:

1. In a motor adapted to have the rotor shaft thereof exposed to a pressurized fluid, the combination comprising an annular pressure barrier, shaft means disposed in the opening in said pressure barrier and having one end thereof projecting outwardly from the corresponding end of said pressure barrier, an annular rotor structure having the central opening thereof receiving said pressure barrier therein, a rotor mounting means secured to said shaft adjacent said one end thereof and overlying said corresponding pressure barrier end, means securing said rotor structure to said rotor mounting means, an annular stator structure disposed outwardly of said rotor structure and receiving said rotor structure in the opening thereof, and sealing means interposed between said shaft and said pressure barrier to prevent the leakage of fluid to said rotor.

2. In a motor adapted to have the rotor shaft thereof exposed to a pressurized fluid, the combination comprising an annular pressure barrier, shaft means disposed in the opening in said pressure barrier and having one end thereof projecting outwardly from the corresponding end of said pressure barrier, an annular rotor structure having the central opening thereof receiving said pressure barrier therein, a rotor mounting means secured to said shaft adjacent said one end thereof and overlying said corresponding pressure barrier end, means securing said rotor structure to said rotor mounting means, an annular stator structure disposed outwardly of said rotor structure and receiving said rotor structure in the opening thereof, and sealing means interposed between said shaft and said pressure barrier permitting a limited flow of fluid therepast, said barrier having flow path means formed therein communicating with the region within said pressure barrier intermediate said sealing means and said rotor mounting means to transport said limited fluid flow therethrough, whereby said last-mentioned flow does not communicate with said rotor structure.

3. In a motor adapted to have the rotor shaft thereof exposed to a pressurized fluid, the combination comprising an annular pressure barrier, shaft means disposed in the opening in said pressure barrier and having one end thereof projecting outwardly from the corresponding end of said pressure barrier, a annular rotor structure having the central opening thereof receiving said pressure barrier therein, a rotor mounting means secured to said shaft adjacent said one end thereof and overlying said corresponding pressure barrier end, means securing said rotor structure to said rotor mounting means, an annular stator structure disposed outwardly of said rotor structure and receiving said rotor structure in the opening thereof, pressure reducing means formed on at least one of said shaft and said pressure barrier and located intermediate the other end of said shaft and said rotor mounting means to decrease the pressure of said system at positions adjacent said rotor mounting means, said pressure reducing means being formed to permit a quantity of leakage flow therepast, and conduit means communicating with the region intermediate said rotor mounting means and pressure reducing means to remove said leakage flow therefrom.

4. In a motor adapted to have the rotor shaft thereof exposed to a pressurized fluid, the combination comprising an annular pressure barrier, shaft means disposed in the opening in said pressure barrier and having one end thereof projecting outwardly from the corresponding end of said pressure barrier, an annular rotor structure having the central opening thereof receiving said pressure barrier therein, a rotor mounting means securing to said shaft adjacent said one end thereof and overlying said corresponding pressure barrier end, means securing said rotor structure to said rotor mounting means an annular stator structure disposed outwardly of said rotor structure and receiving said rotor structure in the opening thereof, pressure reducing means formed on at least one of said shaft and said pressure barrier and located intermediate the other end of said shaft and said rotor mounting means to decrease the pressure of said system at positions adjacent said rotor mounting means, said pressure reducing means being formed to permit a quantity of leakage flow therepast, and conduit means formed in said pressure barrier and communicating with the region intermediate said rotor mounting means and pressure reducing means to remove said leakage flow therefrom.

5. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding part of said outwardly disposed shaft portion, whereby the other end of said shaft is disposed outwardly of said pressure barrier opening, a rotor structure of annular configuration having the opening thereof receiving said pressure barrier therein, a rotor mounting means fixedly secured to said shaft at a position intermediate said other shaft end and said pressure barrier, means fixedly securing said rotor mounting means to said rotor structure for rotating said shaft upon rotation of said rotor, an annular stator structure disposed outwardly of said rotor structure with said rotor structure being diposed in the opening thereof, and sealing means disposed on at least one of said shaft and said pressure barrier.

6. In a motor adapted to have the rotor shaft thereof exposed to a pressurized fluid, the combination comprising an annular pressure barrier, a shaft disposed in the opening in said pressure barrier with one end of said shaft adapted to be disposed in said pressurized fluid, a first controlled leakage sealing means disposed between said shaft and said pressure barrier, said first sealing means being constructed to permit a relatively small flow of leakage fluid therethrough, conduit means connected to said pressure barrier and communicating with the space between said pressure barrier and said shaft means on the side of said first sealing means remote from said one end of said shaft for conducting said flow of leakage fluid away from said motor, a second controlled leakage sealing means disposed intermediate said one end of said shaft and said first sealing means, whereby said leakage flow of fluid through said first sealing means passes through said second sealing means, said second sealing means being formed to reduce the pressure thereacross when there is a relatively larger quantity of fluid flow therethrough, whereby said second sealing means is substantially inoperative when said relatively smaller quantity of leakage fluid flows to said first sealing means and is operative when the leakage flow of fluid through said first sealing means increases, and said conduit means being sized to accommodate said relatively larger flow of leakage fluid in bypassing relationship to said motor.

7. In a motor adapted to have the rotor shaft thereof exposed to a pressurized fluid, the combination comprising an annular pressure barrier, a rotatable shaft disposed in the opening in said pressure barier and having one end thereof projecting outwardly from the corresponding end of said pressure barrier, an annular rotor structure having the central opening thereof receiving said pressure barrier therein, a rotor mounting means removably secured to said shaft adjacent said one end thereof overlying said corresponding pressure barrier end, means securing said rotor structure to said rotor mounting means, an annular stator structure disposed outwardly of said rotor structure and receiving said rotor structure in the opening thereof, sealing means interposed between said shaft and said pressure barrier to prevent the leakage of fluid to said rotor, a thrust runner removably secured to said shaft and disposed intermediate said rotor mounting means and said one end of said shaft, and thrust absorbing means for absorbing axial thrust disposed to engage said thrust runner.

8. In a motor adapted to have the rotor shaft thereof exposed to a pressurized fluid, the combination comprising an annular pressure barrier, a rotatable shaft disposed in the opening in said pressure barrier and having one end thereof projecting outwardly from the corresponding end of said pressure barrier, an annular rotor structure having the central opening thereof receiving said pressure barrier therein, a rotor mounting means secured to said shaft adjacent said one end thereof overlying said corresponding pressure barrier end, means securing said rotor structure to said rotor mounting means, an annular stator structure disposed outwardly of said rotor structure and receiving said rotor structure in the opening thereof, sealing means interposed between said shaft, and said pressure barrier to prevent the leakage of fluid to said rotor, a thrust runner fixedly secured to said shaft and disposed intermediate said rotor mounting means and said one end of said shaft, thrust absorbing means for absorbing axial thrust disposed to engage said thrust runner and a radial bearing means disposed to engage the outward surface of said thrust runner to facilitate the rotation of said thrust runner and said shaft.

9. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first anti-frictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening theerof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator supporting means and positioned to engage that end of said rotor structure disposed adjacent said pump casing to facilitate the rotation thereof.

10. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on either said pressure barrier or said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, and third and fourth antifrictional means mounted on said stator supporting means and positioned to engage the ends of said rotor structure, respectively to facilitate the rotation thereof.

11. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator support means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, antifrictional means mounted on said stator supporting means and positioned to engage said outward surface to facilitate rotation of said thrust runner and said shaft, and axial thrust absorbing means mounted on said stator supporting means and positioned to engage at least one of the laterally extending surfaces of said thrust runner for absorbing axial thrust on said shaft.

12. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor, supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator supporting means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, fourth antifrictional means mounted on a portion of said stator supporting means and positioned to engage said outward surface to facilitate rotation of said thrust runner and said shaft, axial thrust absorbing means mounted on said stator supporting means portion and positioned to engage at least one of the laterally extending surfaces of said thrust runner for absorbing axial thrust on said shaft, and said thrust runner and said stator supporting means portion being removable, whereby said first sealing means is exposed to the exterior of said motor-pump unit upon removal of said stator supporting means portion, said thrust runner and said rotor supporting means.

13. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator supporting means and disposed to engage the end of said rotor adjacent said pump-casing to facilitate the rotation thereof, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

14. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, third and fourth antifrictional means mounted on said stator supporting means and positioned to engage the ends of said rotor structure, respectively to facilitate the rotation thereof, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

15. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator supporting means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, antifrictional means mounted on said stator supporting means and positioned to engage said outward surface to facilitate rotation of said thrust runner and said shaft, axial thrust absorbing means mounted on said stator supporting means and positioned to engage at least one of the laterally extending surfaces of said thrust runner for absorbing axial thrust on said shaft, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

16. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larged quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlaying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator supporting means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, fourth antifrictional means mounted on a portion of said stator supporting means and positioned to engage said outward surface to facilitate rotation of said thrust runner and said shaft, axial thrust absorbing means mounted on said stator supporting means portion and positioned to engage at least one of the laterally extending surfaces of said thrust runner for absorbing axial thrust on said shaft, and said thrust runner and said stator supporting means portion being removable, whereby said first sealing means is exposed to the exterior of said motor-pump unit upon removal of said stator supporting means portion, said thrust runner and said rotor supporting means, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

17. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator supporting means and disposed to engage the end of said rotor adjacent said pump casing to facilitate the rotation thereof, said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator, and additional conduit means formed in one of said pump casing and said pressure barrier communicating between the exterior of said motor-pump unit and the leakage flow path formed between said pressure barrier and said shaft at a position between said first antifrictional means and said impeller for supplying fluid to said first antifrictional means and to said first and said second sealing means.

18. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, and third and fourth antifrictional means mounted on said stator supporting means and positioned to engage the ends of said rotor structure respectively to facilitate the rotation thereof, said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator, and additional conduit means formed in one of said pump casing and said pressure barrier communicating between the exterior of said motor-pump unit and the leakage flow path formed between said pressure barrier and said shaft at a position between said first antifrictional means and said impeller for supplying fluid to said first antifrictional means and to said first and said second sealing means.

19. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator, and additional conduit means formed in one of said pump casing and said pressure barrier communicating between the exterior of said motor-pump unit and the leakage flow path formed between said pressure barrier and said shaft at a position between said first antifrictional means and said impeller for supplying fluid to said first antifrictional means and to said first and said second sealing means.

20. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to oposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a second antifrictional means mounted on said pressure barrier for an enhancing rotation of said shaft and interposed on said pressure barrier intermediate said first and said second sealing means, a rotor supporting means removably secured to said shaft and positioned theron intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a third antifrictional means mounted on said stator supporting means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, fourth antifrictional means mounted on a portion of said stator supporting means and positioned to engage said outward surface to facilitate rotation of said thrust runner and said shaft, axial thrust absorbing means mounted on said stator supporting means portion and positioned to engage at least one of the laterally extending surfaces of said thrust runner for absorbing axial thrust on said shaft, said thrust runner and at least that portion of said stator supporting means portion upon which said axial thrust absorbing means and said fourth antifrictional means are mounted being removable, whereby said first sealing means is exposed to the exterior of said motor-pump unit upon removal of said last mentioned stator mounting means portion, said thrust runner and said rotor support means, said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator, and additional means formed in one of said pump casing and said pressure barrier communicating between the exterior of said motor-pump unit and the leakage flow path formed between said pressure barrier and said shaft at a position between said first antifrictional means and said impeller for supplying fluid to said first antifrictional means and to said first and said second sealing means.

21. In a motor adapted to have the rotor shaft thereof exposed to a pressurized fluid, the combination comprising an annular pressure barrier, shaft means disposed in the opening in said pressure barrier and having one end thereof projecting outwardly from the corresponding end of said pressure barrier, an annular rotor structure having the central opening thereof receiving said pressure barrier therein, a rotor mounting means secured to said shaft adjacent said one end thereof and overlying said corresponding pressure barrier end, means securing said rotor structure to said rotor mounting means, an annular stator structure disposed outwardly of said rotor structure and receiving said rotor structure in the opening thereof, and fluid flow path means formed in said pressure barrier to extend closely adjacent the inward surface of said rotor structure providing a fluid therein for cooling said rotor.

22. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said presure barrier, a first leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a suporting means for said stator, second antifrictional means mounted on said stator supporting means and positioned to engage that end of said rotor structure disposed adjacent said pump casing to facilitate the rotation thereof.

23. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barriers and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation in said rotor, an annular stator structure disposed outwardly of said rotor structure with said rotor structure being disposed in the opening thereof, a supporting means for said stator, and second and third antifrictional means mounted on said stator supporting means and positioned to engage the ends of said rotor structure, respectively to facilitate the rotation thereof.

24. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a second antifrictional means mounted on said stator supporting means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, antifrictional means mounted on said stator supporting means and positioned to engage said outward surface to facilitate rotation of said thrust runner and said shaft, and axial thrust absorbing means mounted on said stator supporting means and positioned to engage at least one of the laterally extending surfaces of said thrust runner for absorbing axial thrust on said shaft.

25. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a second antifrictional means mounted on said stator supporting means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, third antifrictional means mounted on a portion of said stator supporting means and positioned to engage said outward surface to facilitate rotation of said thrust runner and said shaft, axial thrust absorbing means mounted on said stator supporting means portion and positioned to engage at least one of the laterally extending surfaces of said thrust runner for absorbing axial thrust on said shaft, and said thrust runner and said stator supporting means portion being removable, whereby said first sealing means is exposed to the exterior of said motor-pump unit upon removal of said stator supporting means portion, said thrust runner and said rotor support means.

26. In a motor-pump unit, the combination comprising a pump casing, impeller means disposed in said pump casing, a rotable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a second antifrictional means mounted on said stator supporting means and disposed to engage the end of said rotor adjacent said pump-casing to facilitate the rotation thereof, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

27. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, second and third antifricational means mounted on said stator supporting means and positioned to engage the ends of said rotor structure respectively to facilitate the rotation thereof, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

28. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a second antifrictional means mounted on said stator support means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, antifrictional means mounted on said stator supporting means and positioned to engage said outward surface to facilitate rotation of said thrust runner and said shaft, axial thrust absorbing means mounted on said stator supporting means and positioned to engage at least one of the laterally extending surfaces of said thrust runner for absorbing axial thrust on said shaft, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

29. In a motor-pump unit, the combination comprising a pump casing, impeller means disposed in said pump casing, a rotatable shaft extending through an opening in said casing and having one end thereof secured to said impeller means with a substantial portion of said shaft disposed outwardly of said pump casing, an annular pressure barrier secured to said pump casing adjacent said opening, said pressure barrier having the opening therein surrounding a part of said outwardly disposed shaft portion, whereby the other end of said shaft projects outwardly from said pressure barrier, a first limited leakage sealing means coupled to opposed portions of said shaft portion and said pressure barrier, said first sealing means being formed to pass a relatively smaller leakage flow therethrough, a second sealing means disposed intermediate said first sealing means and said impeller and formed to permit the flow of a relatively larger quantity of leakage flow therethrough, said second sealing means forming a leakage fluid flow path in series with the leakage fluid flow path of said first sealing means, a first antifrictional means mounted on at least one of said pressure barrier and said pump casing for enhancing rotation of said shaft and disposed intermediate said impeller and said second sealing means, a rotor supporting means removably secured to said shaft and positioned thereon intermediate said pressure barrier and said other end of said shaft, said rotor supporting means overlying said pressure barrier, a rotor structure of annular configuration having an opening thereof receiving said pressure barrier therein, means fixedly securing said rotor supporting means to said rotor structure for rotating said shaft upon rotation of said rotor, an annular stator structure disposed outwardly of said rotor structure with said rotor structure being disposed in the opening thereof, a supporting means for said stator, a second antifrictional means mounted on said stator supporting means and positioned to engage that end of said rotor structure disposed adjacent said pump casing to facilitate the rotation thereof, a thrust runner mounted on said shaft intermediate said rotor supporting means and said other end, said thrust runner having its outward surface extending parallel to said shaft, third antifrictional means mounted on a portion of said stator supporting means and positioned to engage said outward surface to facilitate rotation of said thrust runner and said shaft, axial thrust absorbing means mounted on said stator supporting means portion and positioned to engage at least one of the laterally extending surfaces of said thrust runner for absorbing axial thrust on said shaft, said thrust runner and said stator supporting means portion being removable whereby said first sealing means is exposed to the exterior of said motor-pump unit upon removal of said stator supporting means portion, said thrust runner and said rotor support means, and said pressure barrier having conduit means formed therein and extending from a position intermediate said first sealing means and the adjacent end of said pressure barrier to a position underlying said rotor and said stator for accommodating the flow of leakage fluid passing through said first sealing means in bypassing relationship with respect to said rotor and said stator.

30. In a motor adapted to have the rotor shaft thereof exposed to a pressurized fluid, the combination comprising an annular pressure barrier, a shaft disposed in the opening in said pressure barrier with one end of said shaft adapted to be disposed in said pressurized fluid, a first controlled leakage sealing means disposed between said shaft and said pressure barrier, said first sealing means being constructed to permit a relatively small flow of leakage fluid therethrough, conduit means connected to said pressure barrier and communicating with the space between said pressure barrier and said shaft means on the side of said first sealing means remote from said one end of said shaft for conducting said flow of leakage fluid away from said motor, a second controlled leakage sealing means disposed intermediate said one end of said shaft and said first sealing means, whereby said leakage flow of fluid through said first sealing means passes through said second sealing means, and said second sealing means being formed to reduce the pressure thereacross when there is a relatively larger quantity of fluid flow therethrough, whereby said second sealing means is substantially inoperative when said relatively smaller quantity of leakage fluid flows to said first sealing means and is operative when the leakage flow of fluid through said first sealing means increases.

31. In a motor adapted to have the rotor shaft thereof exposed to a pressurized fluid, the combination comprising an annular pressure barrier, a shaft disposed in the opening in said pressure barrier with one end of said shaft adapted to be disposed in said pressurized fluid, a first controlled leakage sealing means disposed between said shaft and said pressure barrier, said first sealing means being constructed to permit a relatively small flow of leakage fluid therethrough, means for conducting said flow of leakage fluid away from said motor, a second controlled leakage sealing means disposed intermediate said one end of said shaft and said first sealing means, whereby said leakage flow of fluid through said first sealing means passes through said second sealing means, and said second sealing means being formed to reduce the pressure thereacross when there is a relatively larger quantity of fluid flow therethrough whereby said second sealing means is substantially inoperative when said relatively smaller quantity of leakage fluid flows to said first sealing means and is operative when the leakage flow of fluid through said first sealing means increases.

32. In a motor adapted to have the rotor shaft thereof exposed to a pressurized fluid, the combination comprising an annular pressure barrier, a shaft disposed in the opening in said pressure barrier with one end of said shaft adapted to be disposed in said pressurized fluid, a first controlled leakage sealing means disposed between said shaft and said pressure barrier, said first sealing means being constructed to permit a relatively small flow of leakage fluid therethrough, means for conducting said flow of leakage fluid away from said motor, a second controlled leakage sealing means disposed intermediate said one end of said shaft and said first sealing means, whereby said leakage flow of fluid through said first sealing means passes through said second sealing means, said second sealing means being formed to reduce the pressure thereacross when there is a relatively larger quantity of fluid flow therethrough, whereby said second sealing means is substantially inoperative when said relatively smaller quantity of leakage fluid flows to said first sealing means and is operative when the leakage flow of fluid through said first sealing means increases, and a third sealing means disposed between said shaft and said pressure barrier on the side of said conducting means remote from said first sealing means, said third sealing means having the parts thereof in rubbing contact and being capable of withstanding the pressure difference imposed thereon by operation of one of said first and second sealing means.

References Cited by the Examiner

UNITED STATES PATENTS

| 2,741,990 | 4/56 | White | 103—87 |
| 2,768,584 | 10/56 | Nicol et al. | 103—87 |
| 2,887,061 | 5/59 | Cametti et al. | 103—87 |
| 2,907,594 | 10/59 | Macks | 277—27 |
| 3,093,382 | 6/63 | Macks | 277—27 |

OTHER REFERENCES

Article by P. Lindhardt, April 1961 issue of British Hydromechanics Research Association, "The Hydrostatic Gas-Bearing as a Non-Touching Gland for rotating Shafts."

ROBERT M. WALKER, *Primary Examiner.*